United States Patent
Gonring

(10) Patent No.: US 11,884,176 B1
(45) Date of Patent: *Jan. 30, 2024

(54) MARINE BATTERY CHARGING SYSTEM FOR A MARINE VESSEL

(71) Applicant: Brunswick Corporation, Mettawa, IL (US)

(72) Inventor: Steven J. Gonring, Slinger, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,433

(22) Filed: Nov. 1, 2022

Related U.S. Application Data

(63) Continuation of application No. 17/133,443, filed on Dec. 23, 2020, now Pat. No. 11,518,261.

(51) Int. Cl.
| | | |
|---|---|---|
| *B60L 53/50* | (2019.01) | |
| *B60L 53/51* | (2019.01) | |
| *B60L 53/302* | (2019.01) | |
| *B60L 53/53* | (2019.01) | |
| *B60L 53/52* | (2019.01) | |
| *H02J 7/35* | (2006.01) | |

(52) U.S. Cl.
CPC .............. *B60L 53/50* (2019.02); *B60L 53/302* (2019.02); *B60L 53/51* (2019.02); *B60L 53/52* (2019.02); *B60L 53/53* (2019.02); *H02J 7/35* (2013.01); *B60L 2200/32* (2013.01)

(58) Field of Classification Search
CPC ....................................................... B60L 53/50
USPC .......................................................... 320/109
See application file for complete search history.

(56) References Cited

U.S. PATENT DOCUMENTS

| | | | |
|---|---|---|---|
| 6,624,533 B1 * | 9/2003 | Swanson ................. | H02P 9/307 307/64 |
| 7,408,273 B2 | 8/2008 | Slocum | |
| 8,043,132 B1 | 10/2011 | Wyant | |
| 9,555,715 B2 | 1/2017 | Sugano | |

(Continued)

FOREIGN PATENT DOCUMENTS

| | | |
|---|---|---|
| EP | 3182547 | 6/2017 |
| EP | 3534454 | 9/2019 |

(Continued)

OTHER PUBLICATIONS

Partial European Search Report issued in Correspondence European Patent Application No. 21215498.3, dated May 19, 2022.

*Primary Examiner* — Jerry D Robbins
(74) *Attorney, Agent, or Firm* — Andrus Intellectual Property Law, LLP

(57) ABSTRACT

A method of operating a charging station for a marine battery on a marine vessel is provided, wherein the charging station includes a charger configured to deliver a DC charge current from an AC power source and wherein the charger is at least partially encapsulated in an enclosure located on a dock structure in or adjacent to a body of water. Upon the marine battery being operatively coupled to the charging station, charging the marine battery with the charger using the power source. At least one pump is controlled to draw in cooling water from the body of water and to circulate the cooling water through the enclosure to cool the charger.

21 Claims, 6 Drawing Sheets

(56) References Cited

U.S. PATENT DOCUMENTS

| | | | | |
|---|---|---|---|---|
| 2010/0038974 A1* | 2/2010 | Imperial | ............... | H02J 7/0042 |
| | | | | 320/137 |
| 2010/0060016 A1* | 3/2010 | Hunter | ..................... | F03G 7/08 |
| | | | | 290/55 |
| 2010/0296230 A1* | 11/2010 | Storck | ..................... | B60L 53/16 |
| | | | | 320/109 |
| 2011/0266996 A1* | 11/2011 | Sugano | ..................... | B60L 3/04 |
| | | | | 320/104 |
| 2012/0256568 A1* | 10/2012 | Lee | ......................... | B60L 7/26 |
| | | | | 429/150 |
| 2014/0375272 A1* | 12/2014 | Johnsen | ................. | B60L 58/19 |
| | | | | 320/136 |
| 2015/0054460 A1 | 2/2015 | Epstein et al. | | |
| 2016/0052410 A1* | 2/2016 | Zhou | ...................... | B60L 58/20 |
| | | | | 320/109 |
| 2016/0121735 A1* | 5/2016 | Sugano | ................... | H02J 7/342 |
| | | | | 320/109 |
| 2018/0326857 A1 | 11/2018 | Pohjanheimo | | |
| 2019/0337406 A1* | 11/2019 | Mingenbach | .......... | H02J 1/102 |
| 2019/0351773 A1* | 11/2019 | Merritt | .................... | B60L 53/51 |
| 2020/0062138 A1* | 2/2020 | Smolenaers | ............ | B60L 53/24 |
| 2020/0189404 A1* | 6/2020 | Haugan | .................. | B60L 53/63 |
| 2021/0380007 A1* | 12/2021 | Merritt | .................... | B60L 53/53 |
| 2021/0402888 A1* | 12/2021 | Alves | ...................... | B60L 50/64 |

FOREIGN PATENT DOCUMENTS

| | | |
|---|---|---|
| GB | 2551875 | 1/2018 |
| TW | M448087 | 3/2013 |
| WO | 9845598 | 10/1998 |
| WO | 2017011475 | 1/2017 |
| WO | 2018202462 | 11/2018 |
| WO | 2020160899 | 8/2020 |

* cited by examiner

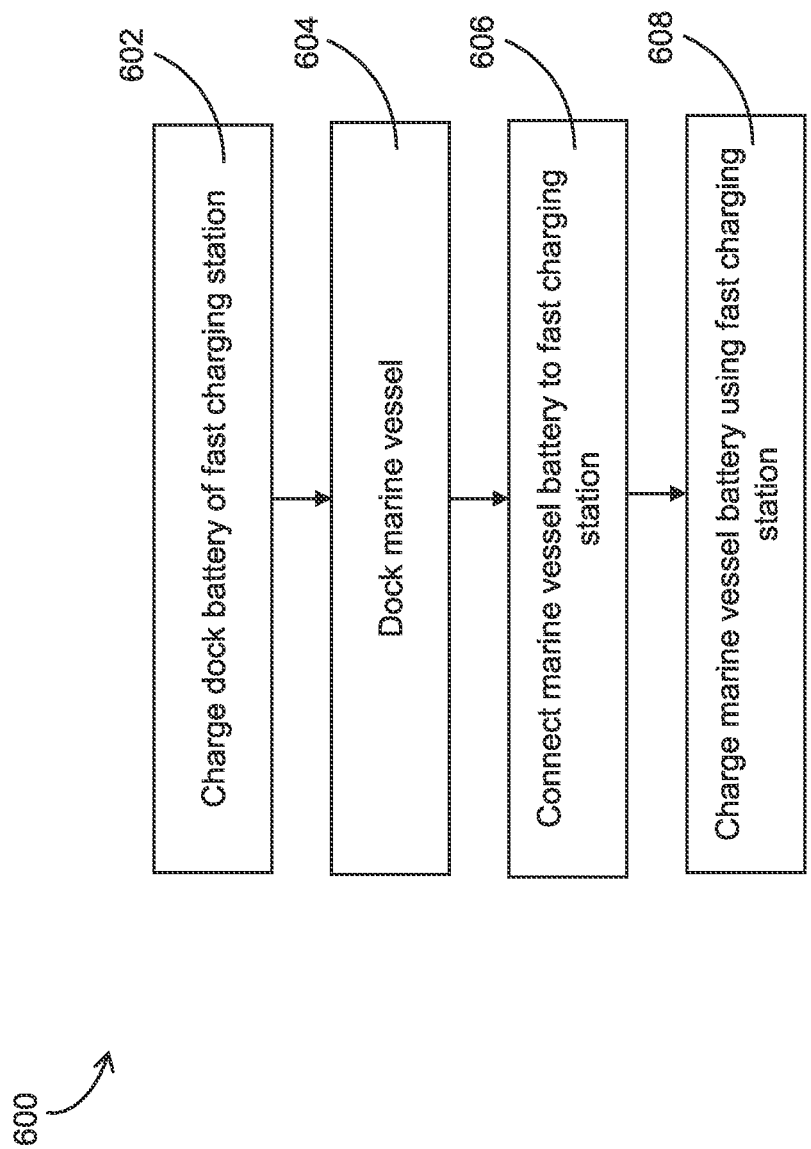

MARINE BATTERY CHARGING SYSTEM FOR A MARINE VESSEL

CROSS REFERENCE TO RELATED APPLICATIONS

This patent application is a continuation of U.S. patent application Ser. No. 17/133,443, filed on Dec. 23, 2020, which is incorporated herein by reference in its entirety.

FIELD

The present disclosure relates to battery charging systems for marine vessels, and particularly to systems and methods for fast charging batteries using standard AC power outlets.

BACKGROUND

U.S. Pat. No. 8,043,132 discloses a hybrid marine vessel that is provided with a system that inhibits the movement of the marine vessel under its own power when the marine vessel is connected or recharging to a stationary source of energy on shore. This avoids significant damage that could otherwise occur if the marine vessel moves away or attempts to move away from the dock when connected by a cable or other device to a stationary structure. The system detects a potential connection between the boat and a stationary shore component, such as a source of energy, and inhibits the transmission from being placed in a forward or reverse gear position under those conditions. Similarly, if the boat is already in a forward or reverse gear position, the system inhibits its being placed into a battery recharging mode.

Taiwanese Patent Publication No. TWM448087 discloses a DC control charging system applied to an electric boat system, which includes a socket module, a charging controller module, and a relay. The socket module can be connected with a charging plug that meets the specifications of the DC fast charging system, so that the charging controller module can communicate with each other through the socket module and the charging station that meets the specifications of the DC fast charging system; the charging controller module is it is used to select and convert the charging demand into the language used by the charger. In addition, it has safety mechanisms such as power detection, emergency stop and hull status judgment. The relay is a charging switch. When the battery is turned on, the battery pack can be charged. The charging system is controlled, and the front panel and the rear panel are modularized to combine the socket module, the charging controller module, and the relay, and the front panel is provided with a supporting portion to help the socket module support the weight of the charging plug.

The above patents and patent publications are hereby incorporated by reference in their entireties.

SUMMARY

This Summary is provided to introduce a selection of concepts that are further described hereinbelow in the Detailed Description. This Summary is not intended to identify key or essential features of the claimed subject matter, nor is it intended to be used as an aid in limiting the scope of the claimed subject matter.

According to one implementation of the present disclosure, a fast charging station for a marine vessel battery on a marine vessel is provided. The fast charging station includes a dock battery, a charger that is operatively coupled to a power source and the dock battery, and an enclosure located on a dock structure in a body of water. The enclosure is configured to encapsulate the dock battery and the charger. The charger is configured to charge the dock battery using the power source when the marine vessel is not docked to the dock structure. The charger is further configured to charge the marine vessel battery using the power source and the dock battery when the marine vessel is docked to the dock structure.

According to another implementation of the present disclosure, a method for operating a fast charging station for a marine vessel battery on a marine vessel is provided. The method includes charging a dock battery of the fast charging station by operatively coupling the dock battery to a power source using a charger of the fast charging station. The dock battery and the charger are encapsulated in an enclosure located on a dock structure in a body of water. The method further includes docking the marine vessel to the dock structure, operatively coupling the marine vessel battery to the charger, and charging the marine vessel battery using the dock battery and the power source.

BRIEF DESCRIPTION OF THE DRAWINGS

The present disclosure is described with reference to the following Figures. The same numbers are used throughout the Figures to reference like features and like components.

FIG. 6 is a flow chart illustrating a process for charging a marine vessel battery using the marine vessel charging systems of the present disclosure.

DETAILED DESCRIPTION

In the present description, certain terms have been used for brevity, clearness and understanding. No unnecessary limitations are to be inferred therefrom beyond the requirement of the prior art because such terms are used for descriptive purposes only and are intended to be broadly construed.

As marine vessels with electric propulsion systems gain popularity with consumers, the problem of efficient marine vessel battery charging becomes more urgent. Marine vessels, like automobiles, require high capacity batteries to provide a reasonable amount of operational time before charging is required, and even expensive battery systems generally provide only two or three hours of operational time. However, unlike automobiles, which have experienced significant improvements in charging system infrastructure in the past few years, the dock charging systems available to marine vessels are often rudimentary or non-existent. For example, some docks have no power available to slips, many other docks only offer a standard single phase 120 V 30 A or 50 A outlet, and very few marinas offer 240 V source or DC fast charging slips.

The present inventor has recognized that the existing infrastructure of each of the above charging options has significant drawbacks. Docks without power available to slips require operators to swap out heavy batteries from the marine vessel so that they can be charged, which can pose a risk of injury to the operator or damage to the batteries during handling. In addition, frequent battery swapping can increase a risk of loose battery connections or incorrect battery mounting due to the number of times the battery must be connected and disconnected from the marine vessel. Docks that provide standard 120 V AC power to a marine vessel's onboard charger (also known as "Level 1" or slow AC charging) can take up to sixteen hours to recharge a standard 10 kW-hr battery. Although access to 240 V AC power (also known as "Level 2" or medium AC charging) or DC fast charging can reduce this charging time by half or more, slips featuring this technology are generally extremely rare and/or reserved for very large vessels.

A dock charging station that utilizes standard 120 V AC outlets to rapidly charge marine vessel batteries would therefore be useful. As disclosed herein, the dock charging station decreases overall charging time both by charging a dock battery when a marine vessel is being used away from the dock, and leveraging DC fast charging to quickly charge the marine vessel battery from the dock battery when the marine vessel is docked. In this way, when the dock battery is fully charged, the marine vessel battery can be fully charged in as little as 30 minutes.

Figure 1:
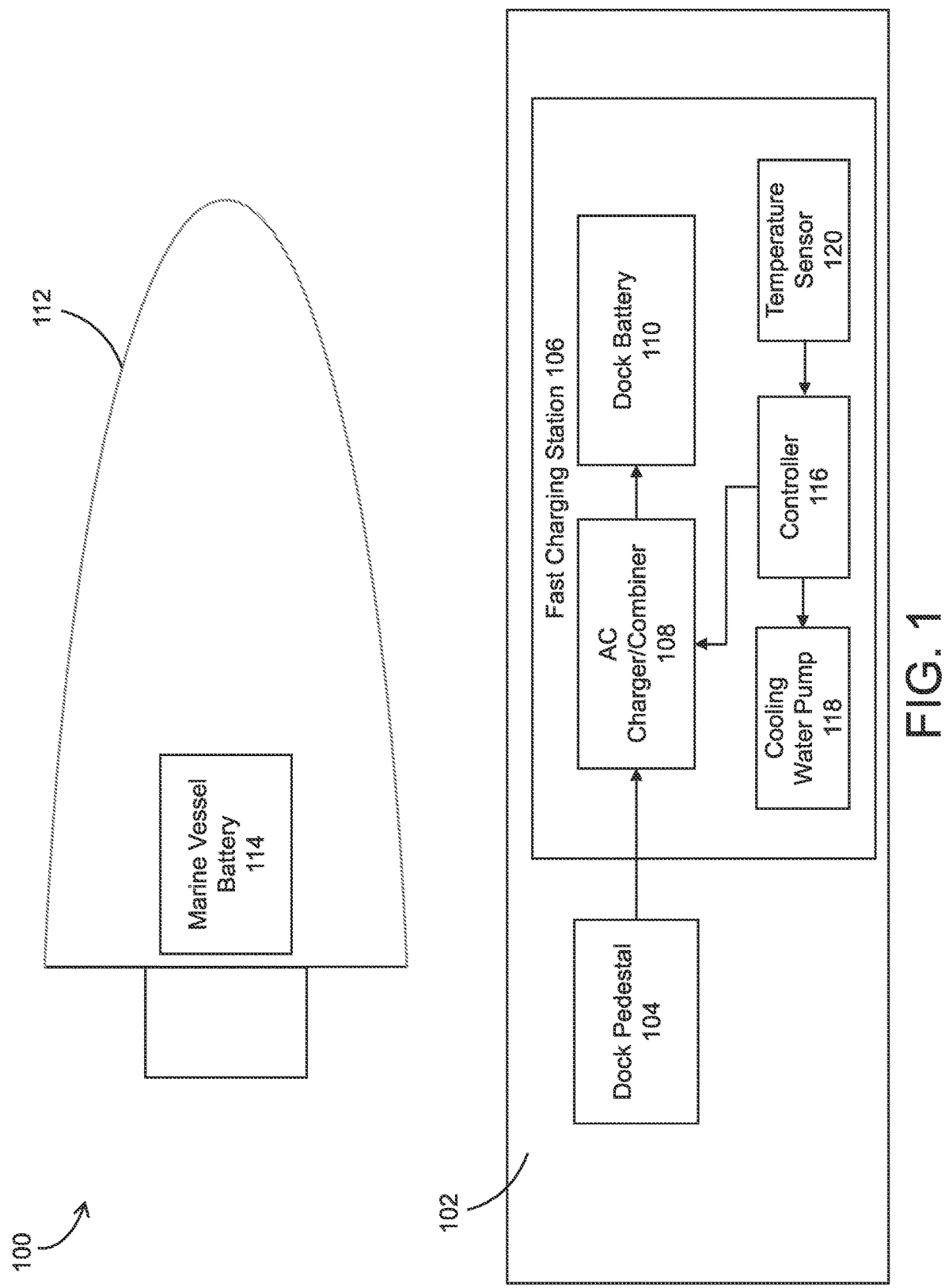
FIG. 1 is a block diagram illustrating a marine vessel charging system according to an exemplary implementation of the present disclosure.
Figure 2:
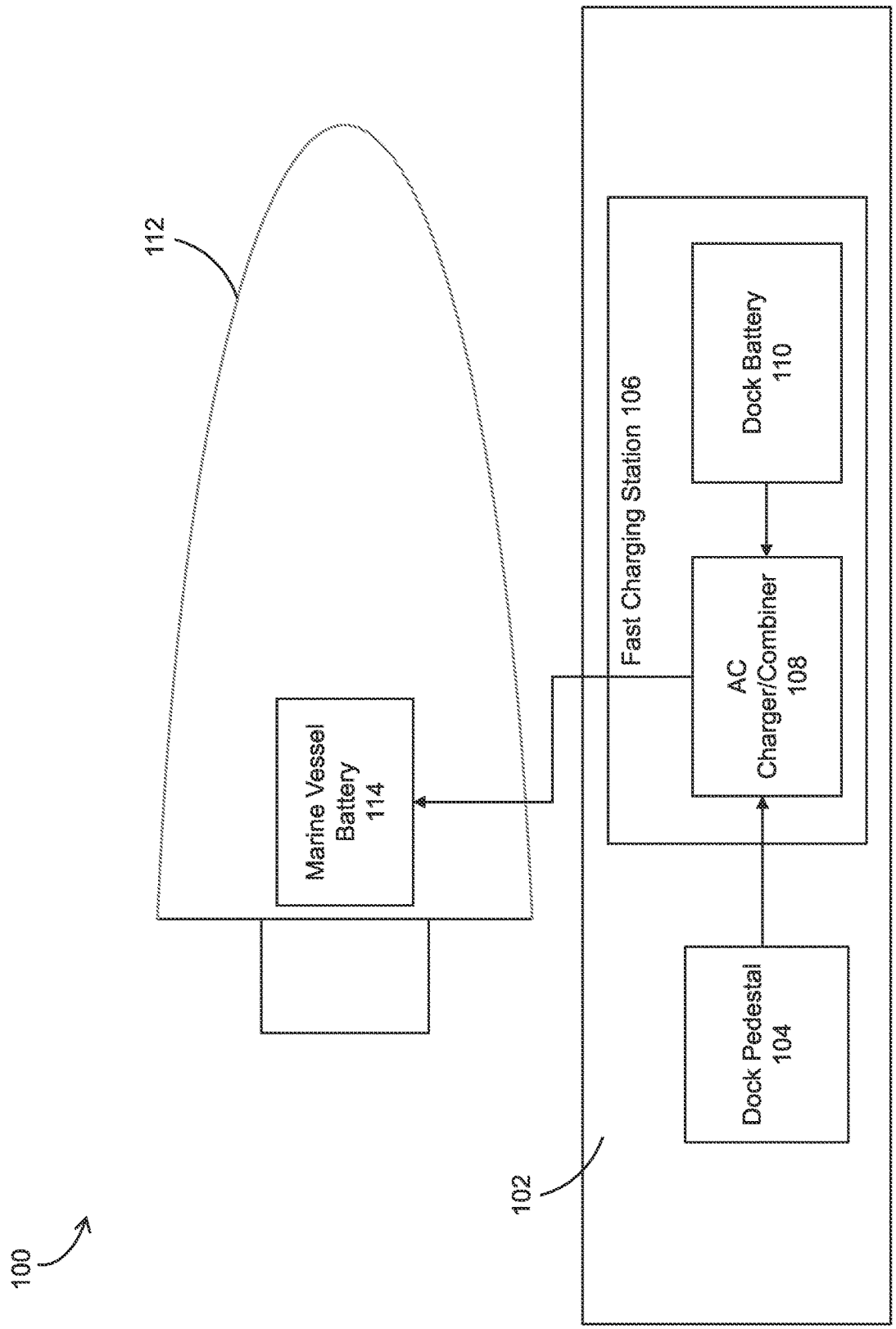
FIG. 2 is a block diagram illustrating the charging of a marine vessel battery using the marine vessel charging system of FIG. 1.

FIGS. 1-2 depict a block diagram of a marine vessel charging system 100 according to an exemplary implementation of the present disclosure. The system 100 is shown to include a dock structure 102 located in a body of water with a dock pedestal 104 and a fast charging station 106. The dock pedestal 104 and the fast charging station 106 may be utilized to charge a marine vessel battery 114 of a marine vessel 112 having an electric propulsion system.

The dock pedestal 104 may be an assembly that is fixed to the dock structure 102 that includes, among other components, one or more power outlets. For example, the power outlets may supply 120 V AC power. The additional outlets or components of the dock pedestal 104 are not particularly limited, and may include water spigots, phone connectors, internet connectors, cable TV connectors, electric meters, water meters, and hose holders.

The fast charging station 106 is shown to include an AC charger/combiner 108 and a dock battery 110. In an exemplary implementation, the AC charger/combiner 108 and the dock battery 110 are located within a common enclosure or housing. In some implementations, the fast charging station 106 may be movable relative to the dock structure 102. In other implementations, the enclosure may be affixed to the dock structure 102 proximate the dock pedestal 104. By fixing the fast charging station 106 to the dock structure 102, in some implementations, the body of water may be advantageously utilized to cool the AC charger/combiner 108 and the dock battery 110. For example, the fast charging station 106 may include a cooling water pump 118 controlled by a controller 116. The pump 118 may be configured to draw cooling water from the body of water and pass it through the enclosure to cool the various components of the fast charging station 106 before ejecting the heated water back into the body of water. The controller 116 may operate the pump 118 based on data received from a temperature sensor 120. For example, the controller 116 may store a maximum threshold temperature. If the temperature sensor 120 indicates that the temperature within the fast charging station 106 enclosure exceeds this maximum threshold temperature, the controller 116 may operate the pump 118 to circulate the cooling water. Alternatively or additionally, the controller 116 may operate the pump based on the sensed temperature, such as to control pump speed and flow rate through the cooling system based on thereon. The temperature sensor 120 may be any suitable type of temperature sensor and is not particularly limited.

The AC charger/combiner 108 may receive energy from the dock pedestal 104 and provide that energy in acceptable form to energy storage devices, for example, the dock battery 110 and the marine vessel battery 114. AC charger/combiner 108 may include all necessary circuitry to perform the rectification and regulation that appropriately converts alternating current power received from the dock pedestal 104 to DC power that is transmitted to the dock battery 110 and/or the marine vessel battery 114. The AC charger/combiner 108 may further include all necessary combiner circuitry required to connect the dock battery 110 and the marine vessel battery 114 automatically in parallel when a charging voltage is applied. In some instances, the combiner circuitry may be otherwise known as an automatic charging relay (ACR) or a voltage sensitive relay (VSR).

The dock battery 110 may include all the typical components of a rechargeable battery cell, namely, a cathode, an anode, an electrolyte, and a separator. In an exemplary implementation, the dock battery 110 is a lithium ion battery with intercalated lithium compound utilized as the cathodic material and graphite utilized as the anodic material. In some implementations, the dock battery 110 includes multiple battery cells. As shown in FIG. 1, when the electric marine vessel 112 is in use and not docked at the dock structure 102, the dock pedestal 104 supplies power to the AC charger/combiner 108, which in turn charges the dock battery 110. In an exemplary implementation, the dock battery 110 may require approximately 8-10 hours to full charge when the dock pedestal 104 supplies 120 V AC power, and 4-5 hours to full charge when the dock pedestal 104 supplies 240 V AC power.

The marine vessel 112 may be any type of watercraft that includes a propulsion device (e.g., an electric motor) and/or a marine vessel load that receives power from a marine vessel battery 114. For example, the marine vessel load may include, but is not limited to, engine starting systems, user interface displays, audio systems, windlasses, depth finders, fish locaters, and appliances. Like the dock battery 110, the marine vessel battery 114 may be a lithium ion battery. In some implementations, the marine vessel battery 114 includes multiple battery cells, such as including a bank of batteries.

Referring specifically to FIG. 2, the marine vessel 112 is depicted as docked to the dock structure 102 and connected to the fast charging station 106. In an exemplary implementation, the dock battery 110 may have a higher nominal voltage than the marine vessel battery 114 to encourage the flow of current in a controlled manner from the dock battery 110 to the marine vessel battery 114. For example, the dock battery 110 may have a nominal voltage of 56 V, while the marine vessel battery 114 may have a nominal voltage of 48 V. The AC charger/combiner 108 may include current limiting features to prevent damage to the dock battery 110 and the marine vessel battery 114, as well as the wiring coupling the dock pedestal 104 to the fast charging station 106, and the fast charging station 106 to the marine vessel battery 114. Advantageously, by operatively coupling the marine vessel battery 114 to both the dock pedestal 104 and the dock battery 110 via the AC charger/combiner 108, a recharging time for the marine vessel battery 114 may be reduced by 50% or more as compared with standard Level 1 charging using the dock pedestal 104.

Figure 3:
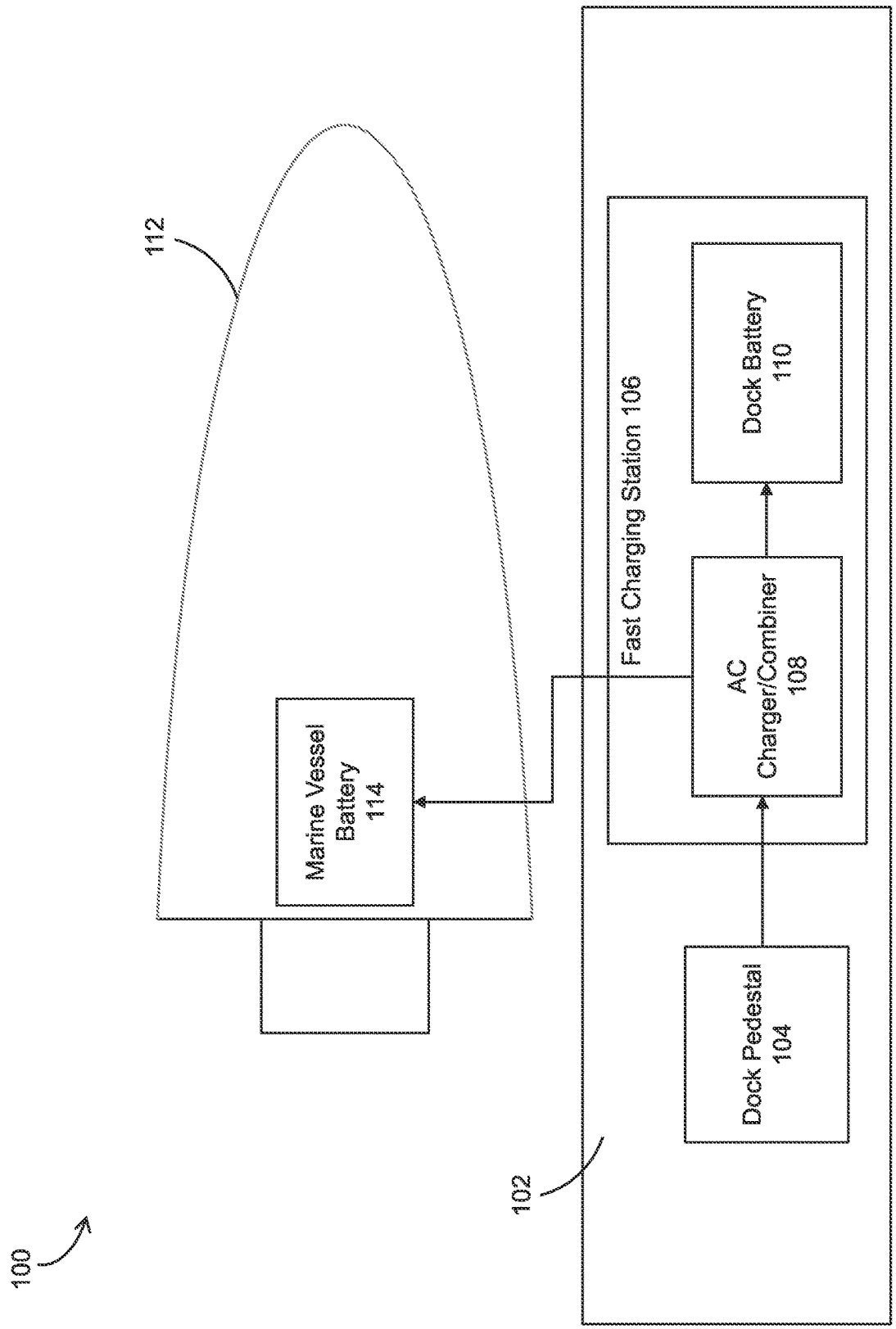
FIG. 3 is a block diagram illustrating the charging of a marine vessel battery and a dock battery using the marine vessel charging system of FIG. 1.

FIG. 3 depicts a block diagram of the marine vessel charging system 100 according to another exemplary implementation. As shown, in some implementations, the dock battery 110 and the marine vessel battery 114 may be charged by the dock pedestal 104 simultaneously or sequentially. If the dock battery 110 and the marine vessel battery 114 are charged sequentially, the fast charging station 106 may include a controller (e.g., controller 116, depicted in FIG. 1) configured to store and implement charge prioritization information for sequential charging. For example, the controller of the fast charging station 106 may be configured to operate the AC charger/combiner 108 to prioritize charging the marine vessel battery 114 to a specified level of charge (e.g., 80% or 90% of maximum capacity) prior to charging the dock battery 110 or vice versa. In further implementations, the controller of the fast charging station 106 may be configured to detect depletion of the dock battery 110 and operate the AC charger combiner 108 such that the marine vessel battery 114 is switched to receive power solely from the dock pedestal 104.

Figure 4:
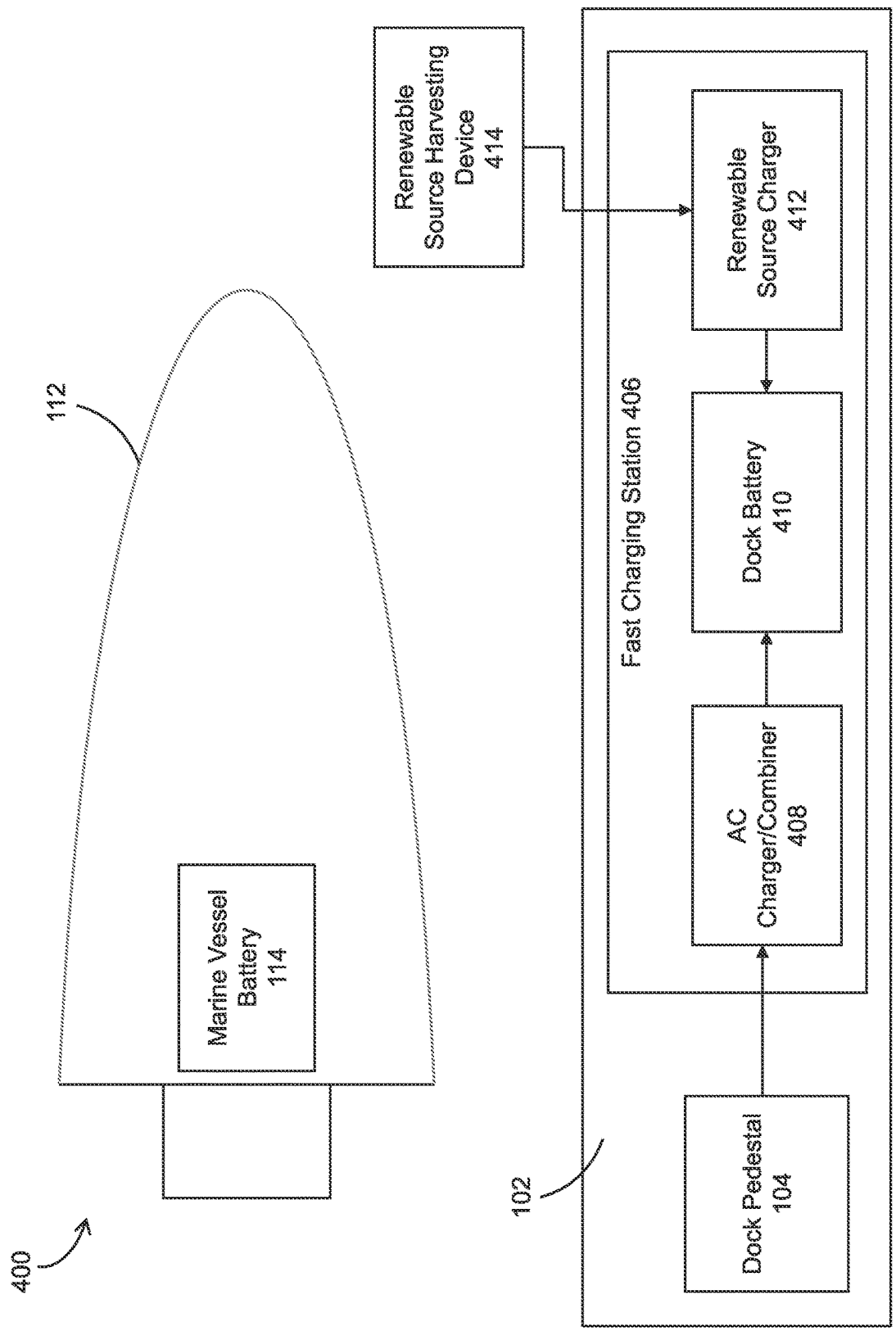
FIG. 4 is a block diagram illustrating a marine vessel charging system that incorporates a renewable energy source according to another exemplary implementation of the present disclosure.

Turning now to FIG. 4, a block diagram of a marine vessel charging system 400 according to another exemplary implementation of the present disclosure is depicted. In addition to receiving power from the dock pedestal 104, as depicted and described above with reference to FIGS. 1-3, the fast charging station 406 is further shown to include a renewable source charger 412 and a renewable source harvesting device 414. For example, if the renewable source is solar power, the renewable source harvesting device 414 may include solar panels, and the renewable source charger 412 may include all necessary circuitry required to regulate the energy harvested by the solar panels. The solar panels may include any suitable type of panels (e.g., monocrystalline, polycrystalline, thin-film). In addition, the fast charging station 406 may include any number of solar panels required to efficiently charge the dock battery 110.

In other implementations, other sources of renewable energy may be incorporated in place of or in addition to a solar power source. For example, the fast charging station 406 may incorporate a wind turbine as the renewable source harvesting device 414 to harvest wind energy. Alternatively, if the dock structure 102 is located within a river or near another moving body of water, the fast charging station 406 may incorporate a hydro turbine as the renewable source harvesting device 414 to harvest hydroelectric energy.

Figure 5:
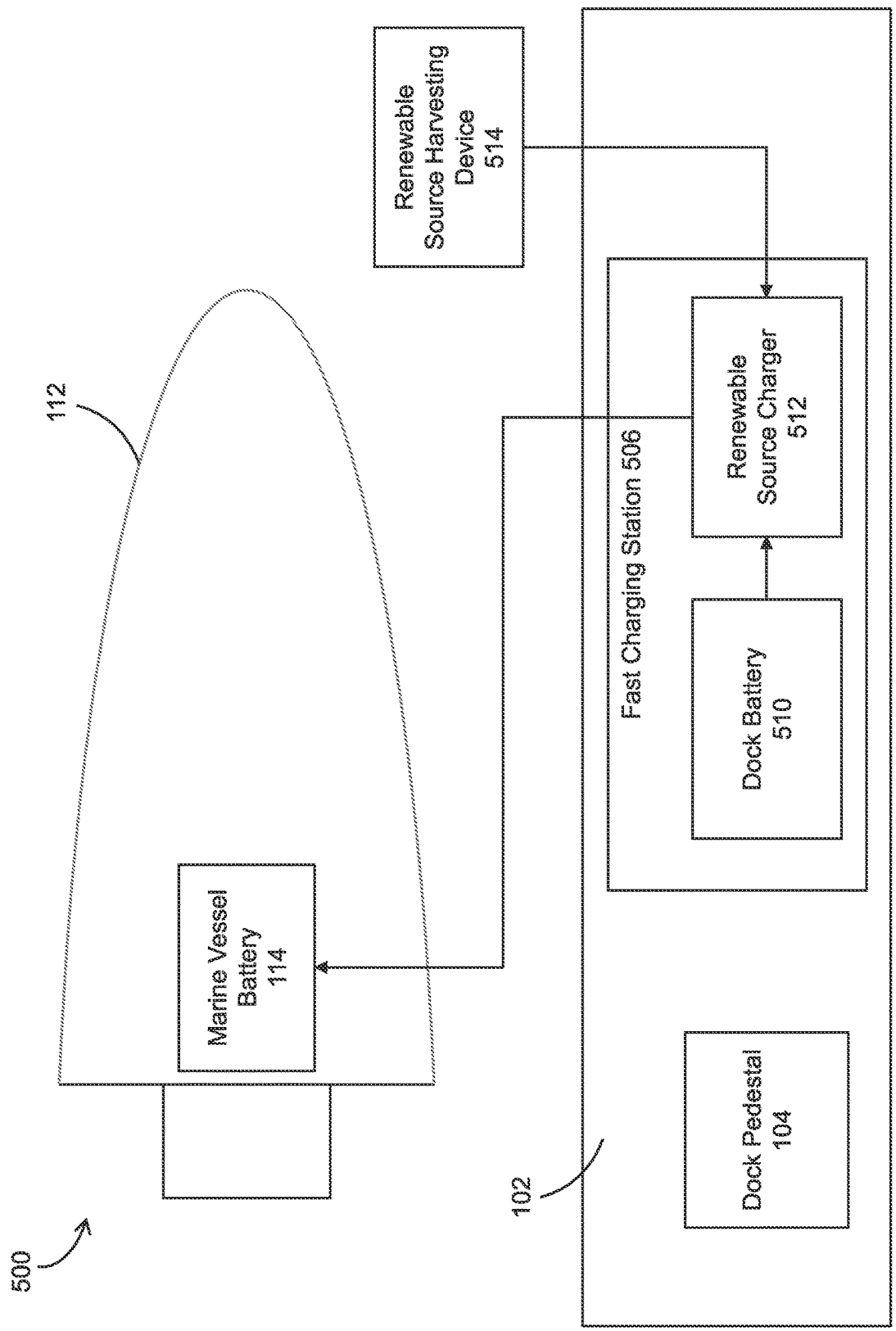
FIG. 5 is another block diagram illustrating the charging of a marine vessel battery using another marine vessel charging system that incorporates a renewable energy source.

In some implementations, when the dock battery can be efficiently charged using a renewable source, the fast charging station may not require connection to a dock pedestal to receive AC power. For example, a user may not want to pay for AC power supplied by a dock pedestal, or may wish to utilize renewable energy sources. In further implementations, AC power may be not be available at a dock. FIG. 5 depicts a block diagram of a marine vessel charging system 500 according to another exemplary implementation of the present disclosure. In contrast to FIGS. 1-4, the fast charging station 506 may not include an AC charger/combiner. Instead, the marine vessel battery 114 may be operatively connected to the renewable source charger 512, and the marine vessel battery may be charged using DC power from both the dock battery 510 and the renewable source harvesting device 514. The renewable source charger 512 and the renewable source energy device 514 may be identical or substantially similar to the renewable source charger 412 and the renewable source energy device 414, depicted and described above with reference to FIG. 4.

Referring now to FIG. 6, a flow chart of a process 600 for charging a marine vessel battery using a fast charging station is depicted. Process 600 may be utilized with either the fast charging station 106 depicted in FIGS. 1-3, the fast charging station 406, depicted in FIG. 4, or the fast charging station 506, depicted in FIG. 5. At step 602, the dock battery (e.g., dock battery 110) of the fast charging station 106 is charged. As implemented using the fast charging station 106, step 602 may comprise operatively coupling an outlet of the dock pedestal 104 to the AC charger/combiner 108 such that energy flows from the dock pedestal 104, through the AC charger/combiner 108, and into the dock battery 110. If implemented by the fast charging stations 406 or 506, step 602 may also include harvesting solar or another type of renewable energy (e.g., wind, hydroelectric) and operatively coupling the renewable source charger 412 to the dock battery 410 such that energy flows both from the dock pedestal 104, through the AC charger/combiner 408 and into the dock battery 410, as well as from the renewable source harvesting device 414, 514 through the renewable source charger 412, 512 and into the dock battery 410, 510.

At step 604, the marine vessel (e.g., marine vessel 112) is docked. As such, step 604 may involve moving the marine vessel 112 proximate the dock structure 102 such that the fast charging station 106, 406, or 506 is easily accessible to the marine vessel 112. Continuing with step 606, the marine vessel battery 114 is coupled to the fast charging station 106, 406, or 506.

Process 600 concludes as the marine vessel battery 114 is charged using the fast charging station 106, 406, or 506. As described above, in some implementations and as depicted in FIG. 2, the marine vessel battery 114 is charged via energy flowing from both the dock pedestal 104 and the dock battery 110. In other implementations and as depicted in FIG. 5, the marine vessel battery 114 is charged via energy flowing from both the dock battery 510 and the renewable source harvesting device 514. By charging the marine vessel battery 114 using multiple sources, the overall charging time is reduced by over 50% as compared with standard Level 1 charging via the dock pedestal 104. In still further implementations, as depicted in FIG. 3, the marine vessel battery 114 is charged simultaneously or sequentially with the dock battery 110. In either case, the marine vessel battery 114 advantageously remains mounted to the marine vessel 112, and recharging periods are minimized, providing maximal operational time and user enjoyment of the marine vessel 112.

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

What is claimed is:

1. A method of operating a charging station for a marine battery for a marine vessel, wherein the charging station includes a charger configured to deliver a DC charge current from an AC power source, wherein the charger is at least partially encapsulated in an enclosure located on a dock structure in or adjacent to a body of water, the method comprising:

upon the marine battery being operatively coupled to the charging station, charging the marine battery with the charger; and controlling at least one pump to draw in cooling water from the body of water and to circulate the cooling water through the enclosure to cool the charger.

2. The method of claim 1, wherein the charging station further includes a dock battery at least partially encapsulated in an enclosure, and further comprising charging the dock battery of the charging station with the charger using the power source prior to the marine battery being connected to the charging station.

3. The method of claim 2, wherein the charger is an A/C charger combiner configured to combine charge currents from the charger and the dock battery to charge the marine battery, and further comprising circulating the cooling water by the pump around the A/C charger combiner and/or the dock battery while the charging station is charging the marine battery.

4. The method of claim 1, further comprising sensing a temperature within the enclosure with a temperature sensor and controlling the pump based on the sensed temperature.

5. The method of claim 4, further comprising controlling at least one of activation of the at least one pump and a pump speed of the at least one pump based on comparison of the sensed temperature to at least one temperature threshold.

6. A method of operating a charging station for a marine battery on a marine vessel, wherein the charging station includes a dock battery and a charger configured to charge the dock battery from an AC power source, wherein the dock battery and the charger are at least partially encapsulated in an enclosure located on a dock structure in or adjacent to a body of water, the method comprising:

charging the dock battery of the charging station with the charger when the marine battery is not connected to the charging station; and upon the marine battery being operatively coupled to the charging station, charging the marine battery with the charger using the dock battery and the AC power source in parallel.

7. The method of claim 6, further comprising operating a pump to circulate, cooling water drawn from the body of water through the enclosure while the charging station is charging the marine battery.

8. The method of claim 7, further comprising sensing a temperature within the enclosure with a temperature sensor, and controlling the pump based on the sensed temperature.

9. The method of claim 8, further comprising controlling at least one of activation of the pump and a pump speed of the pump based on comparison of the sensed temperature to at least one temperature threshold.

10. The method of claim 7, wherein the charger is an A/C charger combiner configured to combine charge currents from the charger and the dock battery to charge the marine battery, and further comprising circulating the cooling water by the pump around the A/C charger combiner and/or the dock battery while the charging station is charging the marine battery.

11. A charging station for a marine battery for a marine vessel, comprising:

a charger operatively coupled to a power source;

an enclosure located on a dock structure in or adjacent to a body of water, the enclosure configured to at least partially encapsulate the charger;

wherein the charger is configured to charge the marine battery when the marine vessel is docked to the dock structure; and a pump configured to circulate cooling water drawn from the body of water through the enclosure to cool the charger.

12. The charging station of claim 11, wherein the charging station is configured to operate the pump while the charger is charging the marine battery.

13. The charging station of claim 11, further comprising a temperature sensor configured to sense a temperature within the enclosure, and a controller configured to control the pump based on the sensed temperature.

14. The charging station of claim 13, wherein the controller is configured to compare the sensed temperature to at least one temperature threshold and control the pump based on the comparison.

15. The charging station of claim 14, wherein the controller is configured to control a pump speed of the pump and/or a flow rate of the cooling water based on the sensed temperature.

16. The charging station of claim 11, wherein the charging station is further configured to eject heated water after circulation through the enclosure back into the body of water.

17. The charging station of claim 11, wherein the power source is an outlet supplying 120 Volt alternating current, therein the outlet is located on a dock pedestal coupled to the dock structure.

18. The charging station of claim 11, further comprising a dock battery within the enclosure and operatively coupled to the charger, wherein the charger is configured to charge the dock battery using the power source when not charging the marine battery and wherein the charger is configured to charge the marine battery using the power source and the dock battery when the marine vessel is docked to the dock structure.

19. The charging station of claim 18, wherein the cooling water is circulated by the pump around the dock battery when the charger is charging the marine battery.

20. The charging station of claim 19, wherein the charger is an A/C charger combiner within the enclosure configured to combine charge currents from the charger and the dock battery to charge the marine battery, wherein the cooling water is circulated by the pump around the A/C charger combiner and/or the dock battery.

21. The charging station of claim 18, wherein the dock battery has a higher nominal voltage than the marine battery.

* * * * *